United States Patent [19]
Imbert

[11] Patent Number: 4,564,115

[45] Date of Patent: Jan. 14, 1986

[54] COVERS WITH A TEARABLE TAMPER-PROOF BAND

[75] Inventor: Jean P. Imbert, Villefranche sur Saone, France

[73] Assignee: La Bellignite, Bellignat, France

[21] Appl. No.: 659,821

[22] Filed: Oct. 5, 1984

[30] Foreign Application Priority Data

Oct. 5, 1983 [FR] France .................. 83 15851

[51] Int. Cl.$^4$ ............................................. B65D 41/18
[52] U.S. Cl. ..................... 215/256; 220/270; 215/305
[58] Field of Search ............... 215/256, 305; 220/270

[56] References Cited

U.S. PATENT DOCUMENTS

| | | | |
|---|---|---|---|
| 3,707,240 | 12/1972 | Wilson | 215/256 |
| 3,860,137 | 1/1975 | Wilson | 215/256 X |
| 3,913,771 | 10/1975 | Acton et al. | 215/256 |
| 4,103,803 | 8/1978 | Irvine | 215/256 X |
| 4,106,653 | 8/1978 | Martinelli . | |
| 4,281,774 | 8/1981 | Mumford | 215/256 X |

FOREIGN PATENT DOCUMENTS 2231577 12/1974 France .
207849 12/1939 Switzerland .

*Primary Examiner*—Donald F. Norton
*Attorney, Agent, or Firm*—Berman, Aisenberg & Platt

[57] ABSTRACT

The present invention provides a reusable cover with a tearable tamper-proof band for the closing of a receptacle with which it is associated.

The cover comprises an opening tongue which forms an integral part of the tamper-proof band before removal of the band and which is situated in such a manner that it is covered by a wrenching lever when the tamper-proof band is in position. The opening tongue is bounded, by two lateral lines of reduced resistance which tear during the wrenching off of the tamper-proof band and by a horizontal line of articulation of the tongue.

2 Claims, 3 Drawing Figures

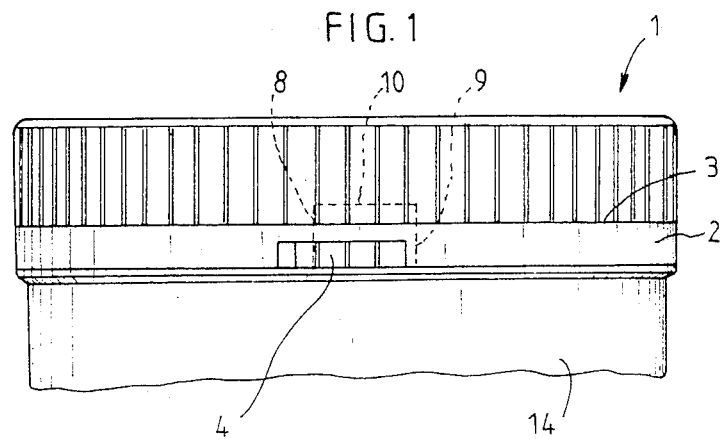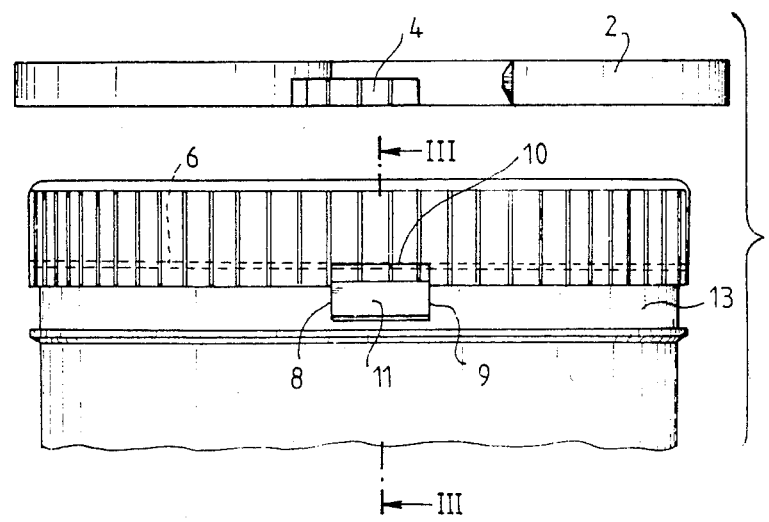

COVERS WITH A TEARABLE TAMPER-PROOF BAND

The present invention relates to improvements to covers with a tearable tamper-proof band, particularly to covers adapted to close jars with a wide opening, and more particularly to the covers adapted to ensure a satisfactory closing of the receptacles with which they are associated, after removal of the tamper-proof band.

Covers with a tearable tamper-proof band are known in the prior art, which can be re-used, after removal of the tamper-proof band, for the closing of the receptacles with which they are associated and which are adapted to be re-used repeatedly to play their closing part.

Such covers with a tearable tamper-proof band consist of a cover body, of a band connected to the lower edge of the cover body by a line of reduced resistance, such as a perforated line for example, of an operating lever rigidly connected to said band which, when it is pulled, permits the separation by wrenching of the above-mentioned band from the lower edge of the cover body, along the line of reduced resistance, and a horizontal lug rigidly connected to the edge of the cover body and projecting in relation to this. The essential purpose of this lug is to facilitate the operation of removal of the cover during the repeated opening of the receptacle which it closes. Such a lug has a double disadvantage, however: it represents a constraint from the point of view of the manufacturing process because it is necessary to provide a projection in the feed channels and moreover it requires the use, during the casting of the cover, of a mould with a drawback or with a carriage, that is to say of a complicated mould with an output slowed down by the arrangement of said drawback; on the other hand it represents a constraint from the point of view of packing because the projecting lugs cause difficulties in introducing receptacles closed by such covers into packing cartons.

Consequently, it is the object of the present invention to provide covers with a tearable tamper-proof band which meet the practical requirements better than the covers of the same type previously known, particularly in that they do not give rise to any problems in manufacture and can be produced at a high rate and in that they do not cause any difficulty at the moment of their packing.

The subject of the present invention is a cover with a tearable tamper-proof band which can be re-used repeatedly, after removal of said tamper-proof band, for the closing of the receptacle with which it is associated, which cover comprises, in the lower region of its skirt, a peripheral line of reduced resistance which is substantially parallel to its lower edge and which defines, with the latter, a band to one region of which there is rigidly connected a lever for wrenching off by pulling of the above-mentioned band, which cover is characterised in that it comprises an opening tongue which forms an integral part of the tamper-proof band before the wrenching off of this, which is situated in such a manner that it is covered by the wrenching lever when the tamper-proof band is in position and which is bounded on the one hand by two lateral lines of reduced resistance which tear during the wrenching off of the tamper-proof band and on the other hand by a horizontal line of articulation of the tongue.

According to an advantageous form of construction of the cover according to the present invention, said lateral lines of reduced resistance are provided on the tamper-proof band and extend beyond the peripheral line of reduced resistance which defines the upper edge of the tamper-proof band, and the line of articulation of the tongue is situated on the skirt of the cover, a little above the region of the tongue corresponding to the lower edge of the skirt of the cover.

Such a relative arrangement of the lateral lines of reduced resistance and of the line of articulation which bound the tongue enables the tongue to be given a sufficiently great height to facilitate considerably the repeated opening raising of the cover after wrenching off of the tamper-proof band.

As is known, the neck of the receptacle carries a slightly projecting ring which, in cooperation with a corresponding groove formed in the inside face of the skirt of the cover, in the vicinity of the lower edge of this, permits the repeated closing of the receptacle by the cover, after the removal of the tamper-proof band.

According to the present invention, the tongue has, on its inside face, in the extension of the peripheral groove which cooperates with said ring carried by the receptacle, a groove of a diameter smaller than the diameter of said ring.

Such an arrangement has the effect of forcing the tongue towards the outside after the removal of the tamper-proof band, which facilitates the manual gripping of said tongue and consequently the lifting of the cover to open the receptacle.

The design of the tongue according to the invention which, contrary to the opening lugs known in the prior art, does not project beyond the cover either in the horizontal plane or in the vertical plane, procures considrable advantages among which there may be mentioned:

the easy handling of this tongue;

the facility and the simplicity of manufacture since the moulding of these tongues does not neccessitate moulds with drawbacks, which, moreover, permits production at a high rate, the elimination of the unevenness constituted by the opening lugs known in the prior art, which facilitates the packing of a group of receptacles closed by the cover according to the invention, in a carton, and which improves the aesthetics of said receptacles.

Apart from the preceding arrangements, the invention comprises yet other arrangements which will be apparent from the following description.

The invention is aimed more particularly at the covers according to the preceding arrangements as well as the receptacles closed by means of said covers, whether these are still provided with their tamper-proof band or no longer comprise it, as well as the production lines for said covers and receptacles, and the lines for filling said receptacles with products in the course of which the automated or manual fitting of the covers is effected at the end of the filling.

The invention will be better understood with the aid of the remainder of the description which follows and which refers to the accompanying drawing in which:

FIG. 1 is a front view of a receptacle provided with a cover according to the invention, before wrenching off of the tamper-proof band, FIG. 2 is a front view similar to that of FIG. 1, after wrenching off of the tamper-proof band, and FIG. 3 is a view in section on 3—3 of FIG. 2.

It should be clearly understood, however, that this drawing and the corresponding descriptive portions are given solely by way of illustration of the subject of the invention of which they in no way constitute a limitation.

The cover 1 of the type known as "tamper-proof" comprises a tamper-proof band 2 which can be torn along the peripheral line of reduced resistance 3, by manual pulling exerted on the wrenching lever 4 rigidly connected to the band 2. The wrenching off of the tamper-proof band 2 puts an end to the inviolability of the receptacle closed by such a cover. Nevertheless, the receptacle 14 can be opened and closed again repeatedly by providing the neck 13 of the receptacle 14, in known manner, with a projecting peripheral ring 5 which cooperates with a groove 6 formed in the face of the skirt 7 of the cover 1. Moreover, the lifting of the cover with a view to opening the receptacle is facilitated by the arrangement of a projecting opening lug, in known manner.

According to the invention, lateral lines 8, 9 of reduced resistance and a horizontal line of articulation 10 define, on the band 2 and partially on the lower portion of the skirt 7 of the cover, a quadrilateral 11 which, when the cover 1 still comprises its tamper-proof band, is situated just below the wrenching lever 4 which conceals it almost entirely. A pull exerted on said lever 4 leads to the wrenching off of the tamper-proof band 2, said wrenching off beginning at the lateral line 8 which is in the direction of wrenching off to stop at the lateral line 9, thus releasing the tongue 11 which is articulated about the line of articulation 10. The arrangement of the line of articulation 10 above the region corresponding to the lower edge 3 of the skirt 7 of the cover 1 has the effect of increasing the height of the tongue 11 and facilitates the repeated manoeuvres of lifting the cover.

It goes without saying that such an arrangement of the line of articulation 10 is not critical and that this may equally well be in the extension of the lower edge 3 of the skirt 7 of the cover.

As can be seen in FIGS. 2 and 3, the tongue 11 is designed to be naturally forced slightly towards the outside; such an arrangement is obtained by giving the groove 12, formed in the inside face of the tongue 11, a diameter different from that of the groove 6 formed at the same level on the inside face of the skirt of the cover and adapted to receive the ring 5 carried by the neck of the receptacle, the diameter of the groove 12 being, in particular, smaller than the diameter of the ring 5 to force the tongue 11 slightly outwards and so facilitate its gripping.

According to the invention, a cover with a tearable tamper-proof band is obtained which can be re-used repeatedly, which can be manufactured simply and at a high rate by moulding without necessitating the placing in position of a mould with a drawback, and which does not comprise any inconvenient unevennesses which give it, apart from the technical advantages, an aesthetic appearance of purer lines when the covers aiming at the same purpose, previously known.

As is clear from the above, the invention is in no way limited to those forms of embodiment and application which have just been described more explicitly; on the contrary, it includes all the modifications which may come to the mind of one skilled in the art, without departing from the framework or the scope of the present invention.

I claim:

1. A repeatedly reusable cover for closing a receptacle of the type having a ring carried by a neck portion, said cover comprising a skirt having a tearable tamper-proof band between a lower edge of said skirt and a peripheral line of reduced resistance formed in a lower region of said skirt substantially parallel to said lower edge, a lever for wrenching off said band, said lever being rigidly connected to one region of said band, a peripheral groove on the inside face of said skirt for cooperating with the ring of said receptacle to ensure the closing thereof, an opening tongue covered by the wrenching lever when the tamper-proof band is in an initial position, said tongue being formed as an integral part of the tamper-proof band, before the wrenching off thereof, and bounded by two lateral lines of reduced resistance which tear during the wrenching off of the tamper-proof band and by a horizontal line of articulation of the tongue, said cover being characterized in that said lateral lines of reduced resistance are formed on the tamper-proof band and extend beyond the peripheral line of reduced resistance defining the upper edge of the tamper-proof band and in that the line of articulation of the tongue is situated on the skirt of the cover a small distance above the region of the tongue corresponding to the lower edge of the skirt of the cover.

2. A cover as in claim 1, wherein a portion of said peripheral groove which is positioned in the region occupied by said tongue has a length substantially equal to the tongue width and a diameter smaller than the diameter of said ring, thus forcing the tongue slightly outwards when said tongue is released after the wrenching off of the tamper-proof band.

* * * * *